United States Patent
Memarzadeh

[11] Patent Number: 5,272,469
[45] Date of Patent: Dec. 21, 1993

[54] PROCESS FOR MAPPING HIGH RESOLUTION DATA INTO A LOWER RESOLUTION DEPICTION

[75] Inventor: Kazem Memarzadeh, Cambridge, Ohio

[73] Assignee: NCR Corporation, Dayton, Ohio

[21] Appl. No.: 724,244

[22] Filed: Jul. 1, 1991

[51] Int. Cl.$^5$ .............................................. G09G 5/00
[52] U.S. Cl. ................................... 345/173; 345/156
[58] Field of Search ............... 340/706, 712; 178/18, 178/19; 341/50, 57, 77; 358/445, 447, 463

[56] References Cited

U.S. PATENT DOCUMENTS

| | | | |
|---|---|---|---|
| 4,066,977 | 1/1978 | Chambers et al. | 330/129 |
| 4,152,697 | 5/1979 | Rider et al. | 341/99 |
| 4,600,807 | 7/1986 | Kable | 178/19 |
| 4,621,257 | 11/1986 | Brown | 340/706 |
| 4,679,162 | 7/1987 | Ferber et al. | 367/67 |
| 4,680,429 | 7/1987 | Murdock et al. | 340/712 |
| 4,820,886 | 4/1989 | Watson | 178/19 |

*Primary Examiner*—Alvin E. Oberley
*Assistant Examiner*—Gin Goon
*Attorney, Agent, or Firm*—Albert L. Sessler, Jr.

[57] ABSTRACT

A technique for mapping high resolution data into a lower resolution frame, in applications in which the original high resolution data contains a small amount of noise. The improvement is achieved by the introduction of a hysteresis loop into the mapping process.

14 Claims, 6 Drawing Sheets

PROCESS FOR MAPPING HIGH RESOLUTION DATA INTO A LOWER RESOLUTION DEPICTION

BACKGROUND OF THE INVENTION

This invention relates to a process for translating data from one level of resolution to another, and more particularly relates to a process for mapping high resolution data into a lower resolution depiction.

During the past few years, a number of stylus activated personal computers and write input devices, such as signature capture and signature verification peripheral devices which may be used with retail or financial terminals or other business machines, have been introduced into the marketplace. These devices include some type of a digitizer for determining the coordinate location of a pen or stylus on an actual or simulated writing surface, as the operator inputs information by using the pen or stylus.

In a typical arrangement, a transparent digitizer is placed over a flat display panel, such as a liquid crystal display (LCD). As the operator writes on the digitizer using a stylus, the writing is digitized, processed and displayed on the LCD substantially simultaneously, as well as being transmitted to a utilizing device or stored in memory.

The quality of the digitized handwritten script or other indicia displayed on the display is determined by the resolution of the digitizer and the particular display used. In many instances, the resolution of the digitizer is much higher than the resolution of the display with the result that the resolution of the display becomes the limiting factor. However, the use of a relatively high-resolution display is not practical because of the higher cost of the display and the associated required video memory. In such situations, the use of a display of medium resolution is the practical alternative.

When using a display with a lower resolution than the resolution of the digitizer, the higher resolution digitizer data must first be downscaled to the display resolution before the data can be displayed. However, the uncertainty, due to electrical noise, in the high resolution data can pose a problem because of the larger quantization error at the lower resolution.

Figure 1A:
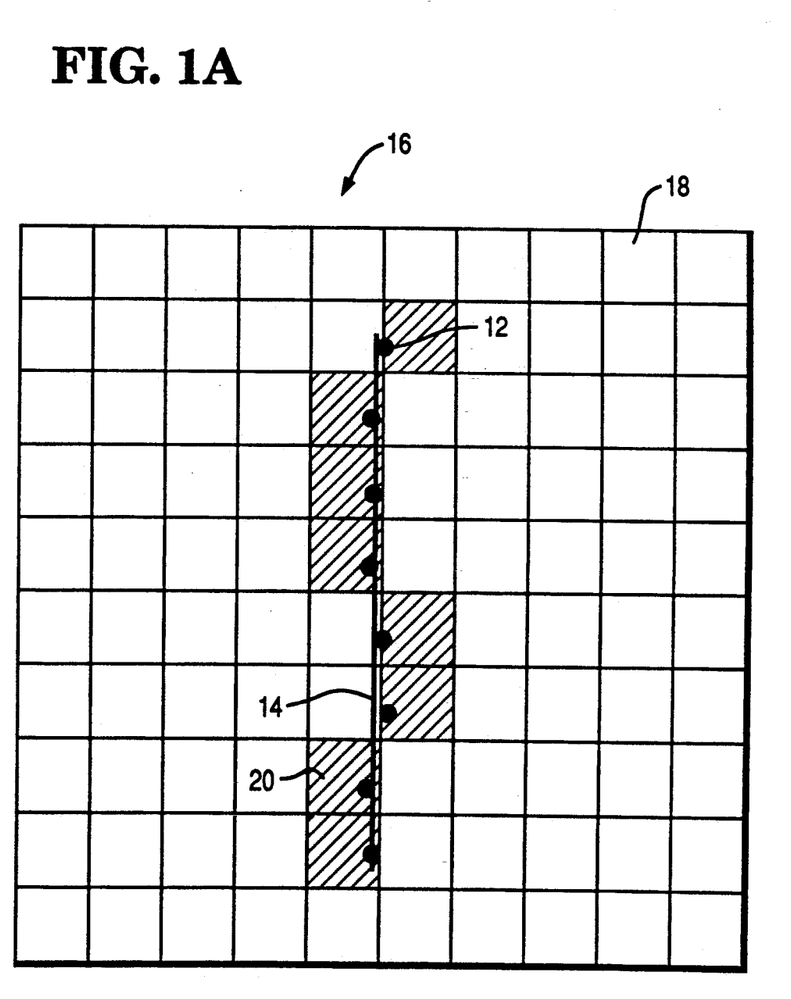
FIG. 1A shows a representation of high resolution data which has been converted to a lower resolution depiction on a display, with resulting distortion.
Figure 1B:
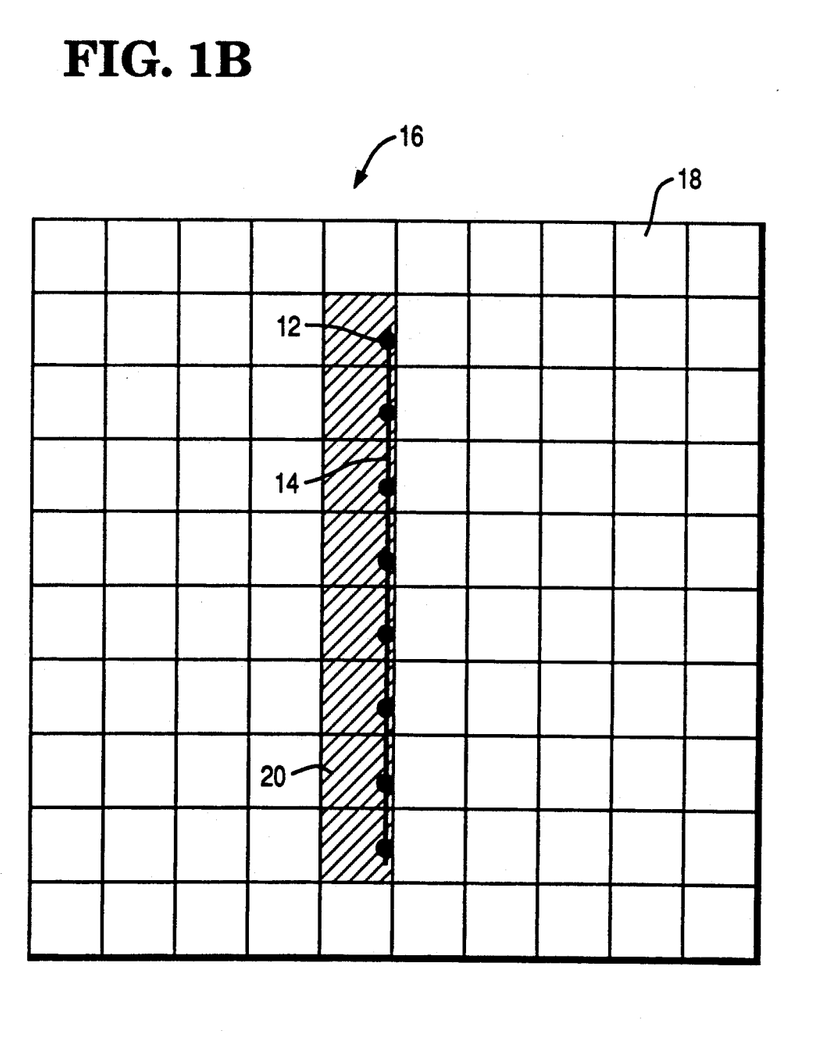
FIG. 1B shows an idealized representation of FIG. 1A in which dots representing a line are precisely aligned without being displaced by noise.

This problem is illustrated in FIG. 1A, where a few sampled points 12 of a typical straight-line segment 14 on a grid 16 are shown. Each square 18 on the grid represents a pixel on the display. The grid 16 is shown in a relatively large scale in order to illustrate the problem. Ideally the sampled points 12 should all be in a straight line as shown in FIG. 1B. However, as can be seen in FIG. 1A, the high resolution sample points 12 do not actually fall precisely in a straight line, due to the small unavoidable electrical noise in the analog signal. In addition, since the points fall along the boundary of two columns of pixels, the selected pixels 20, which are shaded in FIGS. 1A and 1B, do not represent a straight line in FIG. 1A, as they do in FIG. 1B. This phenomenon causes the signal noise to be greatly magnified at the lower resolution. It should be emphasized that no matter how small the noise level is, the above problem will still exist.

One solution to the above problem is to use digital filtering to reduce noise. However the problem will not be eliminated, since the uncertainty in the least significant bit (LSB) is reduced, but is not totally removed. Therefore the irregularity in the straight line can still occur, though less frequently. Also, the additional computations required for digital filtering may cause too much software overhead. Finally, any kind of digital filtering results in some finite time delay, depending on the order of the filter implemented; that is, some previous points are required for the computation of a new point.

SUMMARY OF THE INVENTION

A different approach to the above problem, which does not employ digital filtering, is to introduce small hysteresis loops into the process of mapping the high resolution data from the digitizer into the lower resolution display frame.

In accordance with one aspect of the invention, a process to apply relatively high-resolution data to a relatively low-resolution display so as to minimize distortion resulting from electrical noise comprise the following steps: (a) providing a data-capture device capable of producing relatively high resolution separate data points; (b) providing a display comprising a matrix of pixels, the number of pixels being substantially less than the number of points which can be resolved by the data capture device; (c) entering data on the data-capture device to produce digitized high resolution data for appearance on said display; (d) converting said digitized high resolution data from the data capture device into lower resolution data for energizing selected individual pixels of the display by use of direction dependent values which prevents change of the lower resolution data unless a given minimum threshold change in the high resolution data takes place; and (e) energizing said selected individual pixels of the display.

In accordance with another aspect of the invention, a process to apply relatively high-resolution data to a relatively low-resolution display so as to minimize distortion resulting from electrical noise, comprises the following steps: (a) providing a data capture device capable of producing relatively high resolution separate data points; (b) providing a display comprising a matrix of pixels, the number of pixels being substantially less than the number of points which can be resolved by the data capture device; (c) entering data on the data capture device to produce digitized high-resolution data HRD for appearance on said display; (d) providing a scale factor S defining the scale relationship between the high resolution data HRD and lower resolution data LRD; (e) dividing said high resolution data HRD by said scale factor S to produce a quotient Q and a remainder R; (f) providing first and second hysteresis threshold values TH1 and TH2; (g) determining whether remainder R is less than TH1; (h) if step (g) is true, determining whether a previous lower relolution data value PLRD is less than the quotient Q; (i) if step (h) is true, setting the lower resolution at a value LRD equal to Q−1; (j) if step (h) is not true, setting the lower resolution data value LRD equal to Q; (k) following steps (i) or (j) as applicable, setting a previous lower resolution data value LRD and returning to step (c) to generate another graphical information value; (l) if step (g) is not true, determining whether R is greater than TH2; (m) is R is not greater than TH2, setting the lower resolution data value LRD equal to Q, setting a previous lower resolution data value PLRD equal to the lower resolution data value LRD and returning to step (c); (n) is R is greater than TH2, determining whether the previous lower resolution data PLRD is greater than Q; (o) if PLRD is not greater than Q, setting the lower resolution data value LRD equal to Q, setting a previous lower resolution data value PLRD equal to the lower resolution data value LRD and returning to step (c); (p) if PLRD is greater than Q, setting the lower resolution data LRD equal to Q+1 and then setting the previous lower resolution data PLRD equal to LRD and returning the step (c); and (q) applying the lower resolution data LRD to the display.

It is accordingly an object of the present invention to provide a method for converting high resolution data into lower resolution data.

Another object is to provide a method for converting high resolution graphical digitized data generated by a digitizer into lower resolution data which is depicted on a display, diminishing the distorting effects of electronic noise.

Another object is to provide a method for converting high resolution data into lower resolution data, minimizing resulting distortion by the use of hysteresis.

One embodiment of the invention will now be described by way of example with reference to the accompanying drawings.

DESCRIPTION OF THE PREFERRED EMBODIMENT

Figure 2:
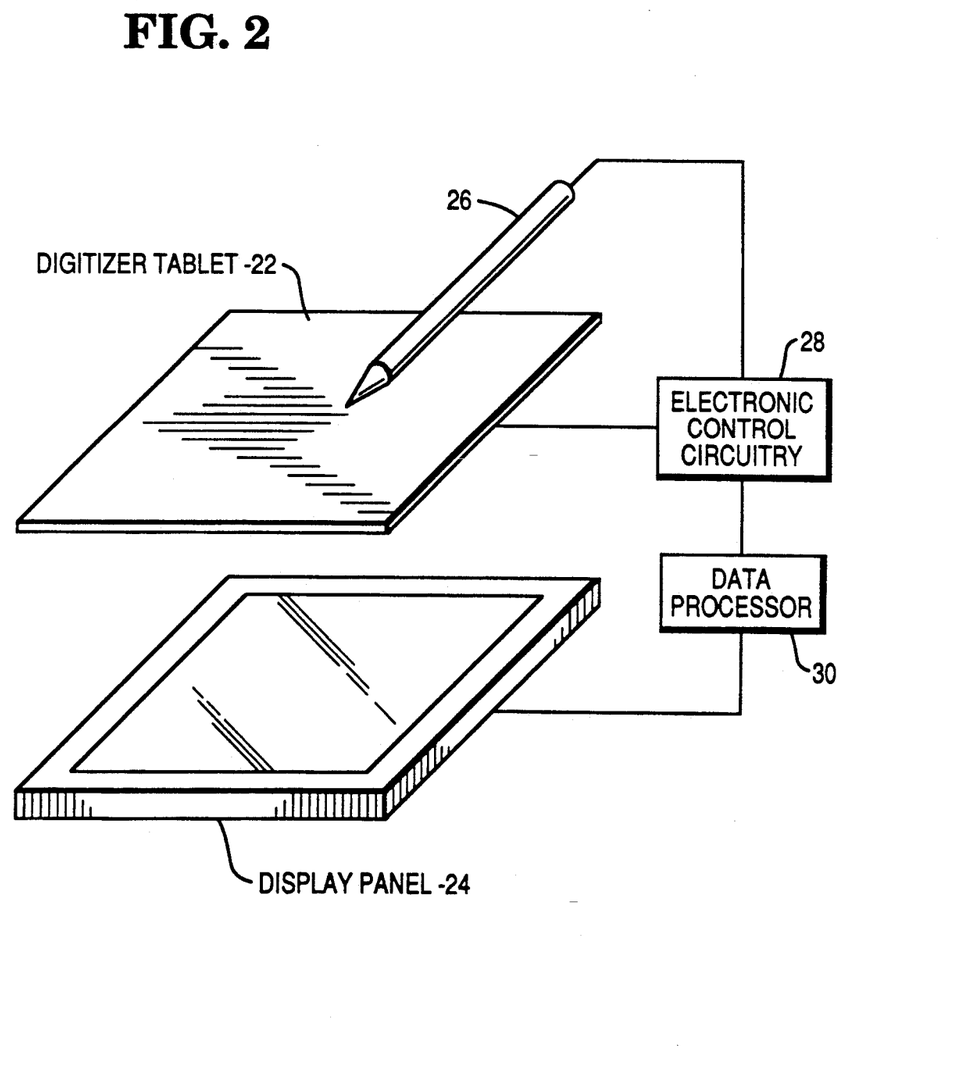
FIG. 2 is a diagrammatic perspective view of a system in which the present invention may be employed.

Shown in FIG. 2 is a perspective diagram of a system in which the present invention may be employed. A transparent digitizer 22, of a type which is commercially available from a number of sources, is placed over a flat display panel 24, which may be of the liquid crystal display type, also commercially available. A stylus 26 is electronically coupled to the digitizer 22 through electronic control circuitry, represented by block 28. The display panel 24 is coupled to the control circuitry 28 by means of a data processor 30 which performs the necessary translation of the data from the digitizer 22 to cause a representation of said data to appear on the display panel 24. Thus as the operator writes on the the digitizer 22 using the stylus 26, the writing is digitized, processed and displayed on the display panel 24 substantially simultaneously.

As previously described in the Background of the Invention, the quality of the digitized handwritten script displayed on the panel 24 is determined by the resolution of the digitizer and the particular display which is used. Use of a display with a lower resolution than the digitizer resolution requires a downscaling of the digitizer data before the data can be displayed. Such downscaling may result in a distorted appearance of the written material on the display because of a larger quantization error at the lower resolution.

In the present invention, the distortion referred to above is reduced or eliminated by the introduction of a hysteresis loop into the process of mapping the high resolution data from the digitizer 22 into the lower resolution display 24.

Figure 3A:
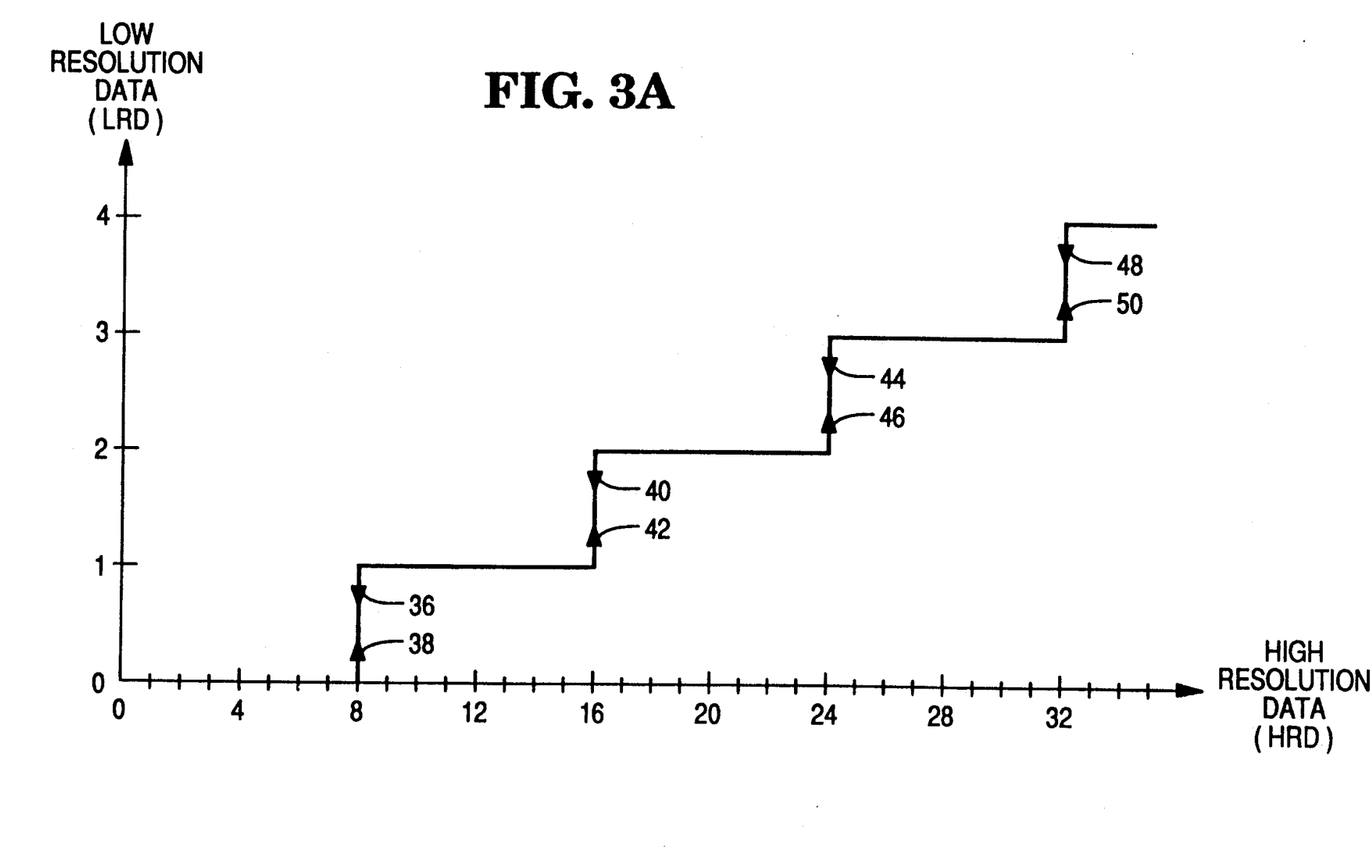
FIG. 3A is a diagram of a mapping from high resolution data to lower resolution data in which hysteresis is not employed.
Figure 3B:
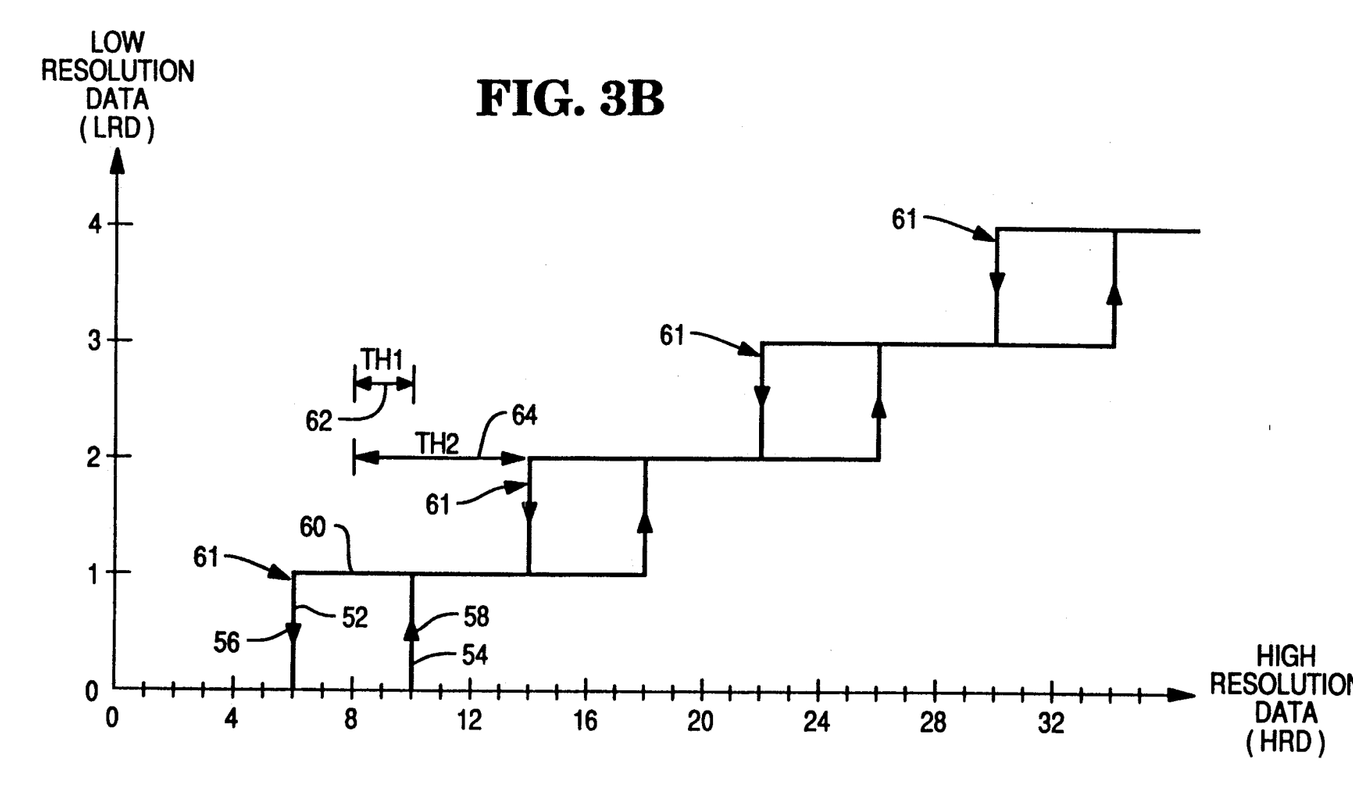
FIG. 3B is a diagram of a mapping process from high resolution data to lower resolution data in which hysteresis is employed, showing a plurality of hysteresis loops.

FIGS. 3A and 3B show respective graphical representations of two mapping processes. In FIG. 3A, no hysteresis is used, while in FIG. 3B, hysteresis is used. The horizontal coordinates of both of these graphs represent the high resolution data HRD, while the vertical coordinates represent the mapped lower resolution data LRD. The scale of reduction from HRD to LRD in these graphs is 8 to 1.

Let it be assumed that the analog signal being processed by the digitizer is at a transition level, where the HRD is continuously switching between the digital values 7 and 8, due to a small electrical noise in the signal. Therefore in the case of the mapping process with no hysteresis, as shown in FIG. 3A, the LRD will be continuously shifting between the digital values of zero and 1, as represented by the arrows 36 and 38, indicating movement in two opposite directions. Similar shifting movements are indicated between the LRD levels of 1 and 2 by the arrows 40 and 42 when the HRD is shifting between the levels of 15 and 16; between the levels 2 and 3 by the arrows 44 and 46 when the HRD is shifting between the levels 23 and 24; and between the levels 3 and 4 by the arrows 48 and 50 when the HRD is shifting between the levels 31 and 32.

When hysteresis is employed in the mapping process, as illustrated in FIG. 3B, no such shifting back and forth takes place. The hysteresis loop 61 is shown in FIG. 3B as having a width of 4 HRD units, represented by the distance between a first vertical line 52 and a second vertical line 54 extending between LRD values of zero and 1. The transitions in the LRD are direction dependent. Thus the line 52 at HRD-6 represents a downward movement as shown by the arrow 56 thereon, representing a return from the one LRD level to the zero level, while the line 54 at HRD-10 represents an upward movement as shown by the arrow 58 thereon, representing a movement from the zero LRD level to the one level. The horizontal line 60 between the lines 52 and 54 represents a shifting of HRD points between 10 and 6. In contrast to the digitizer without hysteresis, the LRD value will be at zero for both values of HRD-7 and HRD-8. In fact as long as the amount of hysteresis in the hysteresis loop 61 is greater than the noise level, the output will stay the same for a fixed input.

It will be noted that two threshold values TH1 and TH2 are graphically represented in FIG. 3B, and are used in the mapping process, as will subsequently be described. The threshold value TH1 represented by line 62 is selected to have a value which is half of the width of the hysteresis loop, or 2 in the illustrated example. The threshold value TH2 represented by line 64 is selected to have a value which equals the scale of reduction minus the value of TH1, or 8 minus 2 equals 6, in the illustrated example. It will be noted that other means of determining the threshold values could be selected, if desired, in accordance with the particular requirements of the mapping process used.

It should be noted that the hysteresis approach does not eliminate the signal noise, but instead suppresses it. Therefore the uncertainty in the HRD due to noise is no longer magnified when the data is downscaled to the lower resolution of the display 24.

Figure 4:
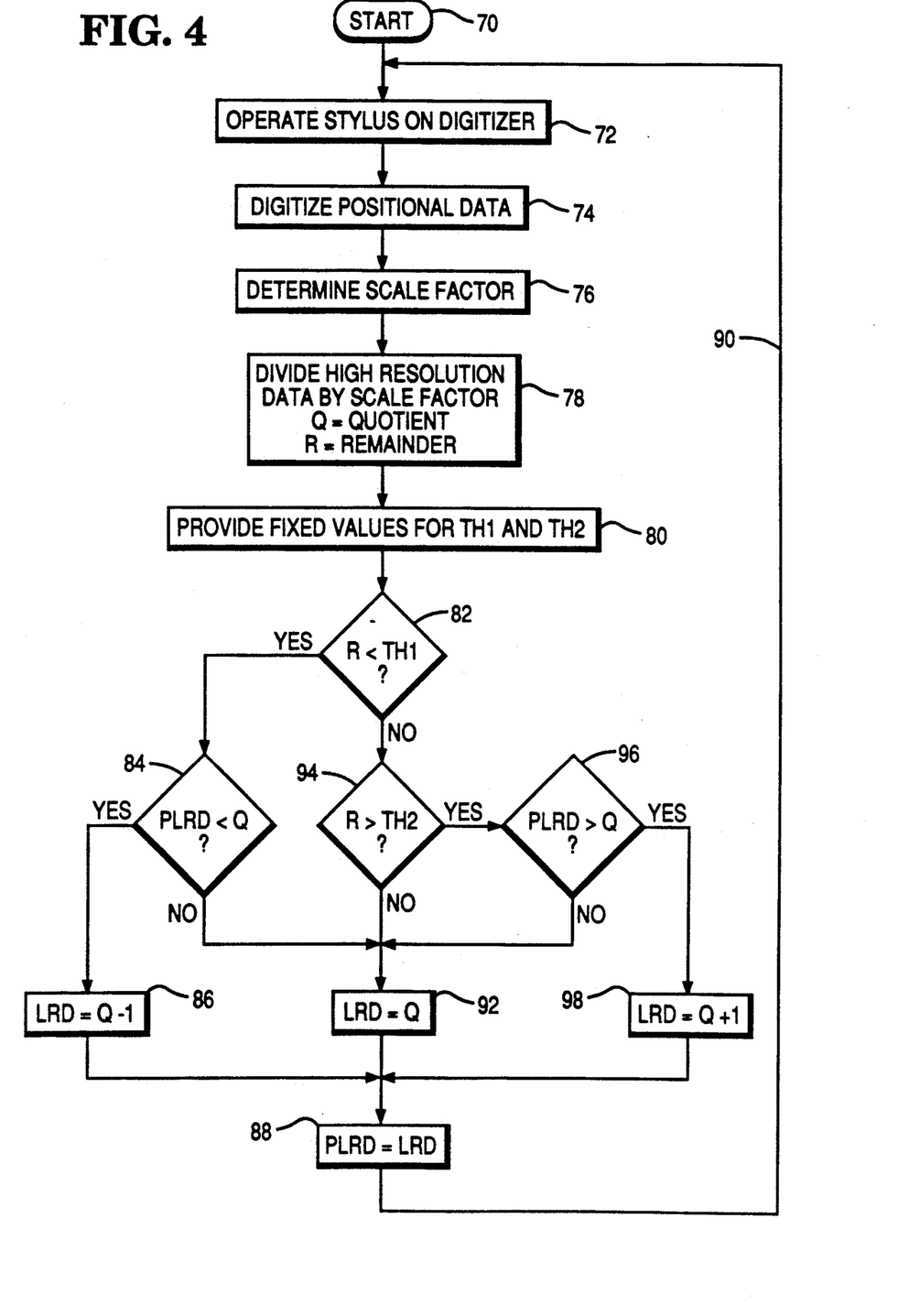
FIG. 4 is a flow diagram of a process for converting high resolution data into lower resolution data.

The hysteresis effect can be implemented in firmware or software in association with the data processor 30 using a routine such as is illustrated in FIG. 4. This routine commences with the start block 70, and is actually initiated when the stylus 26 is operated on the digitizer 22, as represented in block 72. The resulting positional data is digitized, as represented in block 74. The scale factor between the HRD and the LRD, which is fixed for a particular system, is determined, as represented in block 76.

Next, the high resolution data HRD is divided by the scale factor S to provide a quotient Q and remainder R, as represented in block 78. Fixed values are provided for the two thresholds TH1 and TH2, as represented in block 80.

A comparison is now made to determine whether the remainder R is less than the threshold value TH1, as represented by decision block 82. If so, a further comparison is made, as represented by block 84, to determine whether a previous value of lower resolution data PLRD is less than the quotient Q. If so, the lower resolution data value is set equal to Q−1 (block 86). The previous lower resolution data PLRD is then set equal to the lower resolution value LRD (block 88), and the process returns over path 90 to block 72 for further operation of the stylus.

Returning to block 84, if PLRD is not less than Q, the process continues to block 92, in which LRD is set equal to Q. The process then continues to block 88 and over path 90 back to block 72, as previously described.

Returning to block 82, if the remainder R is not less than the threshold value TH1, the process continues to block 94, where a determination is made as to whether the remainder R is greater than the threshold value TH2. If not, the process continues to the previously described block 92, and further continues through block 88 and return path 90 back to block 72. On the other hand, if R is greater than TH2 in block 94, the process continues to decision block 96, in which a determination is made as to whether PLRD is greater than Q. If not the process continues via the previously described blocks 92 and 88, and over return path 90 to block 72. If PLRD is greater than Q, the process continues to block 98, in which LRD is set equal to Q+1. From there, the process continues via block 88 and return path 90 back to block 72.

In order to illustrate the process described above, let it be assumed that the scale of reduction equals 8, the width of the hysteresis loop equals 4, PLRD equals 1 and HRD equals 7. Then Q equals zero, R equals 7. TH1 equals 2 and TH2 equals 6. Starting with block 82, R is not less than TH1, so the process continues to block 94. Since R (7) is greater than TH2 (6), the process goes to block 96. Since PLRD (1) is greater than Q (zero), LRD is set equal to Q+1, or 1, as per block 98. PLRD remains at a value of one, and the process returns to block 72.

If PLRD is equal to zero, the process is the same as described above up to block 96. Since PLRD (zero) is not greater than Q (zero), the process goes to block 92, in which LRD is set equal to Q and is thus equal to zero. This illustrates the directional and hysteresis aspect of the algorithm of FIG. 4, in which the value of LRD is not increased to a new level until the high resolution data has actually reached an upper threshold level corresponding to the next higher level of LRD, but in which, when LRD is at a given level, it is not reduced to the next lower level even though the HRD drops slightly below the upper threshold of the LRD.

In general, if the HRD falls outside the upper and lower thresholds of the hysteresis loop, then LRD equals Q. In the cases in which HRD is within the hysteresis loop, the value of LRD depends on the direction of the data. If the data is increasing, then LRD equals Q−1 when R is less than TH1, and LRD equals Q when R is greater than TH2. For decreasing data, LRD equals Q if R is less than TH1, and LRD equals Q plus 1 if R is greater than TH2. The previous low resolution data PLRD is checked against Q to determine the direction of the data.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. A process to apply relatively high-resolution data to a relatively low-resolution display so as to minimize distortion resulting from electrical noise, comprising the following steps:
    (a) providing a data-capture device capable of producing relatively high resolution separate data points;
    (b) providing a display comprising a matrix of pixels, the number of pixels being substantially less than the number of points which can be resolved by the data capture device;
    (c) entering data on the data-capture device to produce digitized high resolution data for appearance on said display;
    (d) converting said digitized high resolution data from the data capture device into lower resolution data for energizing selected individual pixels of the display by use of direction dependent values which prevents change of the lower resolution data unless a given minimum threshold change in the high resolution data takes place; and
    (e) energizing said selected individual pixels of the display.

2. The process of claim 1, in which the use of direction dependent values comprises the use of a hysteresis loop in said converting step.

3. The process of claim 2, in which the step of converting said digitized high-resolution data includes the sub-step of providing a threshold value which is dependent upon the width of the hysteresis loop.

4. The process of claim 2, in which the step of converting said digitized high-resolution data includes the sub-step of determining the value of the lower resolution data in accordance with the direction of the higher resolution data.

5. The process of claim 1, in which the step of providing a data capture device comprises providing a transparent digitizer positioned over the display so that data entered on the data capture device is visible on the display through the transparent digitizer.

6. The process of claim 2, in which said hysteresis loop prevents change of the lower resolution data unless a given minimum change in high resolution data takes place.

7. The process of claim 6, in which the use of the hysteresis loop includes the use of threshold values which are dependent upon the width of the hysteresis loop.

8. The process of claim 7, in which the value of the lower resolution data depends upon the direction of the high resolution data.

9. A process to apply relatively high-resolution data to a relatively low-resolution display so as to minimize distortion resulting from electrical noise, comprising the following steps:
- (a) providing a data capture device capable of producing relatively high resolution separate data points;
- (b) providing a display comprising a matrix of pixels, the number of pixels being substantially less than the number of points which can be resolved by the data capture device;
- (c) entering data on the data capture device to produce digitized high-resolution data HRD for appearance on said display;
- (d) providing a scale factor S defining the scale relationship between the high resolution data HRD and lower resolution data LRD;
- (e) dividing said high resolution data HRD by said scale factor S to produce a quotient Q and a remainder R;
- (f) providing first and second hysteresis threshold values TH1 and TH2;
- (g) determining whether remainder R is less than TH1;
- (h) if step (g) is true, determining whether a previous lower resolution data value PLRD is less than the quotient Q;
- (i) if step (h) is true, setting the lower resolution at a value LRD equal to Q−1;
- (j) if step (h) is not true, setting the lower resolution data value LRD equal to Q;
- (k) following steps (i) or (j) as applicable setting a previous lower resolution data value LRD and returning to step (c) to generate another graphical information value;
- (l) if step (g) is not true, determining whether R is greater than TH2;
- (m) if R is not greater than TH2, setting the lower resolution data value LRD equal to Q, setting a previous lower resolution data value PLRD equal to the lower resolution data value LRD and returning to step (c);
- (n) if R is greater than TH2, determining whether the previous lower resolution data PLRD is greater than Q,
- (o) if PLRD is not greater than Q, setting the lower resolution data value LRD equal to Q, setting a previous lower resolution data value PLRD equal to the lower resolution data value LRD and returning to step (c);
- (p) if PLRD is greater than Q, setting the lower resolution data LRD equal to Q+1 and then setting the previous lower resolution data PLRD equal to LRD and returning to step (c); and
- (q) applying the lower resolution data LRD to the display.

10. The process of claim 9, in which a hysteresis loop is employed in providing the transition from high resolution positional data to lower resolution positional data.

11. The process of claim 10, in which the threshold value TH1 is selected to be half the width of the hysteresis loop.

12. The process of claim 11, in which the threshold value TH2 is determined by subtracting TH1 from the scale value S.

13. The process of claim 9, in which the digitizer screen is transparent and the display is positioned beneath the digitizer screen and is visible therethrough.

14. The process of claim 9, in which the data capture device includes electronic control circuitry and in which the process is implemented in a data processor coupled to said electronic control circuitry and to said display.

* * * * *